United States Patent [19]

Uchikawa et al.

[11] 4,227,931

[45] * Oct. 14, 1980

[54] SELF-HARDENING MOLD SAND

[75] Inventors: Hiroshi Uchikawa, Funabashi; Hajime Kato, Yokohama, both of Japan

[73] Assignee: Onoda Cement Co., Ltd., Onoda, Japan

[ * ] Notice: The portion of the term of this patent subsequent to Dec. 26, 1995, has been disclaimed.

[21] Appl. No.: 973,611

[22] Filed: Dec. 27, 1978

Related U.S. Application Data

[63] Continuation of Ser. No. 535,169, Dec. 23, 1974, abandoned.

[51] Int. Cl.² .................................................. B28B 7/34
[52] U.S. Cl. ................................. 106/38.35; 106/38.3; 106/90; 106/98; 106/104; 106/109
[58] Field of Search .................. 106/38.3, 38.35, 38.9, 106/90, 98, 104, 109

[56] References Cited

U.S. PATENT DOCUMENTS

| | | | |
|---|---|---|---|
| 2,081,558 | 5/1937 | Prange | 106/38.3 |
| 3,600,203 | 8/1971 | Aldera | 106/38.35 |
| 3,788,868 | 1/1974 | Kitsuda et al. | 106/90 |
| 3,864,141 | 2/1975 | Uchikawa et al. | 106/90 |
| 3,874,885 | 4/1975 | Lyass et al. | 106/38.35 |
| 4,080,213 | 3/1978 | Mori et al. | 106/38.35 |
| 4,113,499 | 9/1978 | Ivanov et al. | 106/38.3 |
| 4,131,474 | 12/1978 | Uchikawa et al. | 106/38.3 |

*Primary Examiner*—Lorenzo R. Hayes
*Attorney, Agent, or Firm*—Price, Heneveld, Huizenga & Cooper

[57] ABSTRACT

The specification discloses a self-hardening mold sand having surface stability and high compressive strength yet containing a comparatively small amount of water. The mold sand is prepared by mixing a self-hardening binder of clinker powder, containing $11CaO \cdot 7Al_2O_3 \cdot CaX_2$ (where X is a halogen atom) and a sulphate, with a binder additive consisting of a surface active agent of which the main component is β-naphthalene-sulphonic acid formaldehyde condensate salt, and then mixing this binder and binder additive with sand, water and preferably a retarder consisting of an organic carboxylic acid or boric acid.

10 Claims, 2 Drawing Figures

SELF-HARDENING MOLD SAND

This is a continuation of application Ser. No. 535,169, filed Dec. 23, 1974, now abandoned.

BACKGROUND OF THE INVENTION

This invention relates to self-hardening mold sand with a comparatively small moisture content, yet having high surface stability and compressive strength.

Prior artisans have provided self-hardening binders for mold sand which harden fast even at low temperature. These binders are made by adding insoluble anhydrite to clinker powder containing calcium haloaluminate of $11CaO.7Al_2O_3.CaX_2$ (X refers to halogen atom).

Now mold sands for casting are being manufactured by mixing binder, or binder with additives such as various kinds of sulphate (for ex. sodium sulphate, calcium sulphate, hemihydrate) and/or with carboxylic acid or boric acid, with fire-resistant granules such as silica sand or olivine sand to develop strength of the sand in a short time.

To facilitate pounding of such mold sands thoroughly, a proper volume of water should be added to achieve proper compressive strength. If too much water remains, casting will not be effected well due to occurrence of "blow" at the time of casting material. Also the stability of mold surface will become low after cured due to "brittle binding" of sand. This causes "scab" and "sand burning."

Water also enhances surface stability. The improvement of surface stability of mold has been attempted for example by increasing binder to enhance the strength of sand or by adding starch to the sand. Yet such was not satisfactory with respect to permeability of the mold, moisture content and fire-resistance of the mold sand.

SUMMARY OF THE INVENTION

The object of the present invention is to produce mold sand having good surface stability and proper compressive strength of the mold while using only a comparatively small amount of water.

The self-hardening mold sand of the present invention is prepared by mixing sand with binder additive and water. The binder additive is composed of self-hardening binder and a surface active agent. The surface active agent has as its main component, β-naphthalene sulfonic acid-formaldehyde condensate salt, of which the average condensation degree ($\bar{n}$) is greater than 5, and of which the salt is a mixture of any one or more kinds of sodium, potassium and calcium. The self-hardening binder is composed of clinker powder, containing calcium haloaluminate of $11Ca0.7Al_2O_3.CaX_2$ (where X is halogen), and sulphate.

The amount of the calcium halo-aluminate contained in the clinker powder is more than 2%, preferably more than 5% in view of initial fast hardening, still more preferably more than 10% to help insure that mold properties of air permeability, fire resistance and recovery are not injured.

The sulphate used as an additive to the clinker powder is an anhydrite, or has an anhydrite as its main part. Any combination of hemihydrate or dihydrate of calcium sulphate, sodium sulphate, potassium alum and sodium alum may be added thereto. The amount of sulphate is to be from 0.5 to 2.0 as the molar ratio $Al_2O_3/SO_3$ in the self-hardening binder.

The amount of binder additive to be added to the sand is from 2 to 20% depending on the amount of calcium halo-aluminate in the clinker powder, and preferably the amount is from 3 to 12% to obtain initial fast hardening and physical properties of mold sand.

The amount of the surface active agent to be added to sand is from 0.02 to 1.0% preferably from 0.05 to 0.5% depending on its effect and economical viewpoint.

Preferably, an organic carboxylic acid or boric acid is added to the mix as a retarder. The organic carboxylic acid to be used are succinic acid, adipic acid, tartaric acid, citric acid, gluconic acid, acetic acid and their sodium, potassium and calcium salts. The boric acid to be used includes such water soluble borates as boric acid, borax and boric anhydride.

The characteristics of the mold sand of the present invention are as follows:

(a) The surface of mold sand after curing exhibits a good surface stability.

(b) Hence the added water can be reduced without changing operation, and the moisture content of the mold sand after curing becomes very low.

(c) The strength of mold is high so that less troubles occur as compared with conventional molds.

DESCRIPTION OF THE PREFERRED EMBODIMENT

Figure 1:
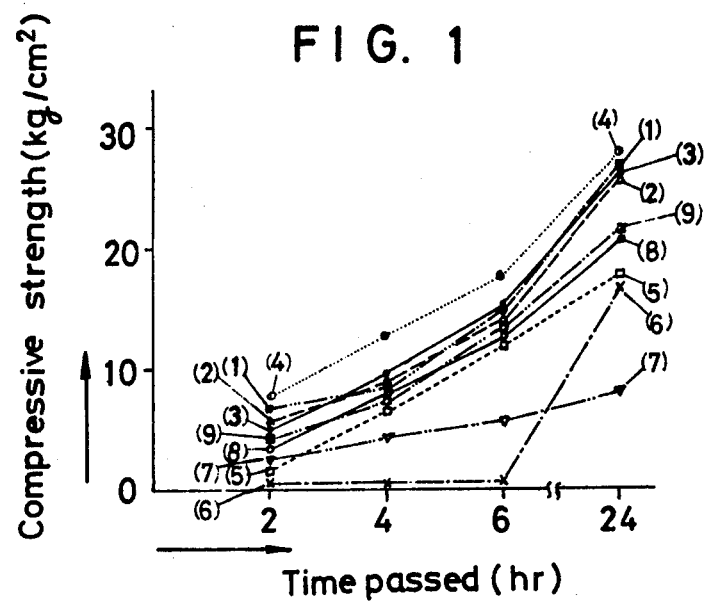
FIG. 1 shows a diagrammatic curvature representing the relation of compressive strength to time elapsed for mold sands made pursuant to test samples (1)–(9) in Experiment I.

Now the particulars of the present invention are explained with reference to the experiments as below.

Experiment I

In Experiment I, the following materials were used to produce mold sands of different formulations:

(a) Sand: Silica sand from MIZUNAMI No. 5 with particle size distribution mainly from 28 mesh to 48 mesh (b) Binder: Two alternative special super high early strength cements were used whose compositions and fineness are shown in Table I, labeled b1 or b2.

(c) Surface active agent (four alternatives):

C1; a sodium salt of condensation products of β-naphthalene-sulphonic acid and formaldehyde of which condensation degree ($\bar{n}$) is equal to 8, the surface active agent used in the present invention C2; Polycyclic sodium sulphonate (of which components are for example)

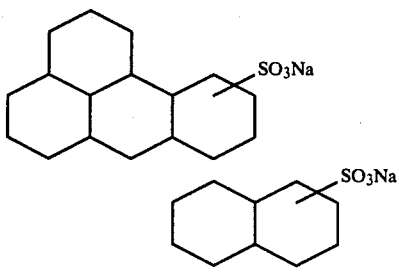

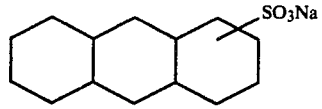

C3; alkyl aryl sulphate (a calcium salt of condensation products of naphthalenesulphonic acid and formaldehyde n̄=2.5)

C4; lignin derivative (d) Bench life control agent (Retarder):
 d1; citric acid
 d2; boric acid

TABLE I

| Composition and Fineness | Binder b1 | Binder b2 |
|---|---|---|
| $C_{11}A_7 Ca F_2$* (See below for explanation of symbols used) | 21% | 21% |
| $C_3 S$* | 51% | 51% |
| $C_2 S$* | 3% | 3% |
| $Ca SO_4$ | 16% | 14% |
| $C_4 AF$* | 7% | 7% |
| $Ca SO_4 \cdot \tfrac{1}{2} H_2O$ | 0% | 2% |
| Miscellaneous** | 2% | 2% |
| Specific Surface Area by Blaine Air Permeability | 5,400 cm²/g | 5,600 cm²/g |

*Explanation of symbols used in Table I
$C_{11}A_7 CaF_2 = 11CaO \cdot 7Al_2O_3 \cdot CaF_2$
$C_2 S = 2CaO \cdot SiO_2$
$C_3 S = 3CaO \cdot SiO_2$
$C_4 AF = 4CaO \cdot Al_2O_3 \cdot Fe_2O_3$
**Misc. = Salts such as $Na_2SO_4$, $K_2SO_4$, MgO, TiO₂

Table II shows the mix proportions of the various materials described above used to create different formulations of mold sand. In mold sands, (1) (2) (3) and (4), the surface active agent of the present invention (Cl) is used. In mold sands (5) (6) and (7), surface active agents other than that of the present invention are used. References (8) and (9) show two mold formulations without any surface active agent.

TABLE II

| Proportion | Present Invention | | | | Reference | | | | |
|---|---|---|---|---|---|---|---|---|---|
| | (1) | (2) | (3) | (4) | (5) | (6) | (7) | (8) | (9) |
| Silica Sand | 100 | 100 | 100 | 100 | 100 | 100 | 100 | 100 | 100 |
| Binder b1 | 8 | 8 | 0 | 8 | 8 | 8 | 8 | 8 | 0 |
| b2 | 0 | 0 | 8 | 0 | 0 | 0 | 0 | 0 | 8 |
| Surface Active Agent C1 | 0.10 | 0.05 | 0.05 | 0.20 | — | — | — | — | — |
| C2 | — | — | — | — | 0.25 | — | — | — | — |
| C3 | — | — | — | — | — | 0.2 | — | — | — |
| C4 | — | — | — | — | — | — | 0.2 | — | — |
| Water | 6 | 6 | 6 | 6 | 6 | 6 | 6 | 6 | 6 |
| Retarder d1 | .008 | .008 | .004 | — | .012 | .012 | .012 | .012 | .008 |
| Retarder d2 | — | — | — | 0.04 | — | — | — | — | — |

Table III shows the character of the mold sands (1)–(9) prepared pursuant to Table II.

TABLE III

Character of the Table II Mold Sands

| Character | Present Invention | | | | Reference | | | | |
|---|---|---|---|---|---|---|---|---|---|
| | (1) | (2) | (3) | (4) | (5) | (6) | (7) | (8) | (9) |
| Bench life (minute) | 40 | 40 | 40 | 40 | 40 | 40 | 40 | 40 | 40 |
| Compressive Strength after 24 Hours (kg/cm²) | 27.0 | 25.8 | 26.4 | 28.6 | 17.7 | 17.0 | 8.0 | 20.7 | 21.8 |
| Percentage of Compressive Strength (%) | 130 | 125 | 121 | 138 | 85.5 | 82.3 | 38.6 | 100 | 100 |
| Surface Stability (%) | 98.0 | 94.8 | 95.5 | 97.3 | 88.0 | 86.4 | 68.3 | 88.9 | 89.6 |

FIG. 1 shows the change of compressive strength relative to time elapsed for each of the mold sand formulations 1–9.

In the strength test of Table III, compressive strength is measured according to JIS Z-2604 (Japan Industrial Standard Z-2604). Surface stability is measured with a 6-mesh sieve mounted on a Sieve Analysis Machine provided with a vibrator. After 24 hours, each test sample is placed on the sieve and vibration is given to the sieve and sample for one minute. Then the weight of sample is measured. Surface Stability = W/WO × 100 (%) where WO; Initial weight of sample
W; Weight of sample after vibration As apparent from FIG. 1 and Table III, while the surface stability of the reference mold sands (5)–(9) is below 90%, those (1)–(4) of the present invention show surface stability as high as 95–98%. That is, in the present invention, the surface stability is normally aimed to be higher than 90%. While it may be possible to formulate prior art compositions having 90% or higher surface stability, these prior art formulations would have defects in permeability and fire-resistance and cannot produce good cast surface. In particular, 93% or higher stability is aimed for practical use. Considering this, it has been proved that very high surface stability mold sand can be obtained with the present invention. Where other surface active agents are used, the surface stability is approximately the same or lower than that achieved without surface active agent.

As to the compressive strength, the surface active agent of the present invention shows that far better results can be obtained than with other surface active agents or than without surface active agents.

Experiment II

Figure 2:
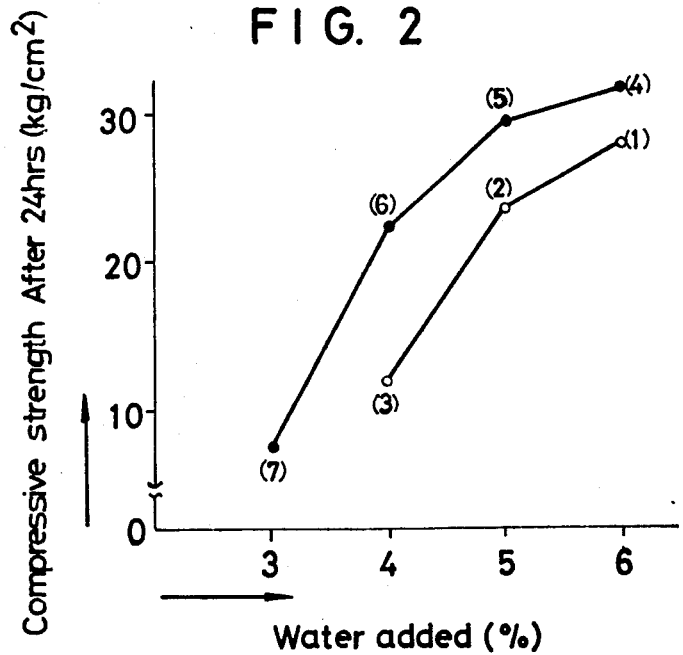
FIG. 2 shows a diagrammatic curvature representing the relation of the compressive strength of mold sands to the volume of added water pursuant to test samples (1)–(7) in Experiment II.

The same sand and binders of Experiment I are used. The relation between compression strength of mold sand and added water is determined using samples of (1)-(7) in Table IV. The results are shown in FIG. 2. Character of these mold sand samples is shown in Table V. Moisture content is measured after 24 hours according to JIS Z-2605.

TABLE IV

| | Mold Sand Mix Proportions Unit: Weight | | | | | | |
|---|---|---|---|---|---|---|---|
| | Sample | | | | | | |
| | Reference | | | Present Invention | | | |
| Composition | (1) | (2) | (3) | (4) | (5) | (6) | (7) |
| Silica Sand | 100 | 100 | 100 | 100 | 100 | 100 | 100 |
| Binder b1 | 10 | 10 | 10 | 10 | 10 | 10 | 10 |
| Surface Active Agent C1 | 0 | 0 | 0 | 0.125 | 0.125 | 0.125 | 0.125 |
| Water | 6 | 5 | 4 | 6 | 5 | 4 | 3 |
| Citric Acid | 0.015 | 0.015 | 0.015 | 0.01 | 0.01 | 0.01 | 0.01 |

TABLE V

| | Character of the Table IV Mold Sands | | | | | | |
|---|---|---|---|---|---|---|---|
| | Sample | | | | | | |
| | Reference | | | Present Invention | | | |
| Character | (1) | (2) | (3) | (4) | (5) | (6) | (7) |
| Bench Life (minute) | 40 | 40 | 40 | 40 | 40 | 40 | 40 |
| Compressive Strength after 24 Hours ($kg/cm^2$) | 28.0 | 23.6 | 12.0 | 31.7 | 29.5 | 22.3 | 7.6 |
| Surface Stability (%) | 92.3 | 90.0 | 72.2 | 98.3 | 97.5 | 89.8 | 63.1 |
| Moisture Content (%) | 2.34 | 2.06 | 1.31 | 2.31 | 1.92 | 1.47 | 1.12 |

As is apparent from Table 5 and FIG. 2, in the present invention, for example in sample (6), where 4%, water is added, the compressive strength is 22.3 $kg/cm^2$ and the surface stability 89.8%, while in sample (2) in the reference, where 5% water is added, approximately same compressive strength 23.6 $kg/cm^2$ and surface stability 90.0% are shown. Therefore in the present invention some 20% less water can be added and the desirable results of adding more water can be achieved without suffering the drawbacks of adding more water.

Also comparison is made as to additive between sample (5) and sample (1). In respect of compressive strength, the two are almost at the same level. However with respect to surface stability, 97.5% in sample (5) is far better than 92.3% in sample (1). Also in the present invention, water addition can be reduced 20% below the conventional.

Therefore in the present invention, moisture content may become less than 2%, while without the additive of this invention, it is very hard to reduce moisture content to less than 2%.

FINAL EXAMPLE

To "Enshu" silica sand (No. 6 of which particle size distribute mainly from 48 mesh to 100 mesh) in ratio (weight) shown in Table VI below, Jet Cement (commercial name of the product of Onoda Cement Co., Ltd.) mineral composition of $11CaO.7Al_2O_3.CaF_2$ 20.6%, β-naphthalenesulphonic condensate sodium salt (average condensation degree 8), sodium salt of gluconic acid soda, were mixed with water. Bench, life, compressive strength, and surface stability of the cured product (sample of after 24 hours after mixing) were measured and the results are shown in the lower part of Table VI.

TABLE VI

| | | No. | |
|---|---|---|---|
| Mixture & Physical Property | | 1 | 2 |
| Mixture | "Enshu" silica sand | 100 | 100 |
| | Jet Cement | 8 | 8 |
| | β-naphthalene-sulphonic acid formaldehyde condensate sodium salt | 0.2 | 0.2 |
| | Sodium salt of gluconic acid | 0 | 0.01 |
| | Water | 6 | 6 |
| Physical Property | Bench life (minutes) | 20 | 40 |
| | Compressive strength ($kg/cm^2$) 2 hours | 4.9 | 2.4 |
| | Compressive strength ($kg/cm^2$) 24 hours | 32.2 | 33.4 |
| | Surface Stability (%) | 99.2 | 98.5 |

The embodiments of the invention in which an exclusive property or privilege is claimed are defined as follows:

1. In a mold sand composition comprising a mixture of sand, water, a self-hardening binder and a surface active agent, the improvement comprising: from about 3 to about 6 percent by weight of water based on the sand; from about 2 to about 20% by weight of binder based on the sand, said self-hardening binder comprising a substantially anhydrite sulphate salt and clinker powder containing at least 2% calcium halo-aluminate of $11CaO.7Al_2O_3.CaX_2$, where X is a halogen atom; and the percentage of said surface active agent to sand is from about 0.02 to about 1.0% by weight, said surface active agent comprising b-naphthalene-sulphonic acid-formaldehyde condensate salt as its main component.

2. Mold sand as claimed in claim 1, which includes from 0.004% to about 0.04% by weight to weight of sand of one of an organic carboxylic acid and boric acid, where said organic carboxylic acid is selected from the group consisting of succinic acid, adipic acid, tartaric acid, citric acid, gluconic acid, acetic acid and their sodium, potassium and calcium salts.

3. Mold sand as claimed in claim 1, wherein said clinker powder contains more than 5% of calcium halo-aluminate of $11CaO.7Al_2O_3.CaX_2$.

4. Mold sand as claimed in claim 1, wherein said clinker powder contains more than 10% of calcium halo-aluminate of $11CaO.7Al_2O_3.CaX_2$.

5. The mold sand of claim 1 in which said substantially anhydrite salt sulphate additionally comprises any of the following: hemihydrate or dihydrate of calcium sulphate, sodium sulphate, potassium alum and sodium alum.

6. The mold sand of claim 1 in which the ratio of said sulphate to said clinker powder is from 0.5 to 2.0, as determined by the $Al_2O_3/SO_3$ molar ratio.

7. Mold sand as claimed in claim 1 wherein the percentage of said binder in said composition is from 3 to 12%.

8. Mold sand as claimed in claim 1 wherein said β-naphthalene-sulphonic acid-formaldehyde condensate salt surface active agent has an average condensation degree greater than 5, and of which the salt comprises any of the sodium potassium and calcium salts.

9. Mold sand as claimed in claim 1 wherein said β-napthalene sulfonic acid-formaldehyde condensate salt surface active agent has an average condensation degree greater than 5, and of which the salt comprises any of the sodium, potassium and calcium salts; and the amount of said surface active agent present in the mold sand is from 0.05 to 0.5%.

10. Mold sand as claimed in claim 2, wherein said boric acid is one selected from the group consisting of boric acid, borax and boric anhydride.

* * * * *